United States Patent [19]
Bloom et al.

[11] Patent Number: 5,764,280
[45] Date of Patent: Jun. 9, 1998

[54] DISPLAY SYSTEM INCLUDING AN IMAGE GENERATOR AND MOVABLE SCANNER FOR SAME

[75] Inventors: David M. Bloom, Portola Valley; Asif A. Godil, Mountain View, both of Calif.

[73] Assignee: Silicon Light Machines Inc., Sunnyvale, Calif.

[21] Appl. No.: 821,391

[22] Filed: Mar. 20, 1997

[51] Int. Cl.⁶ .......................... H04N 13/04; H04N 15/00
[52] U.S. Cl. .................................. 348/53; 345/8
[58] Field of Search .......................... 348/51, 53; 345/7, 345/8; H04N 13/04, 15/00

[56] References Cited

U.S. PATENT DOCUMENTS

| | | | |
|---|---|---|---|
| 4,311,999 | 1/1982 | Upton et al. | 340/755 |
| 4,374,397 | 2/1983 | Mir | 358/505 |
| 4,618,213 | 10/1986 | Chen | 385/144 |
| 4,687,326 | 8/1987 | Corby, Jr. | 356/5 |
| 4,797,694 | 1/1989 | Agostinelli et al. | 346/160 |
| 4,801,194 | 1/1989 | Agostinelli et al. | 350/356 |
| 4,934,773 | 6/1990 | Becker | 350/6.6 |
| 5,003,300 | 3/1991 | Wells | 345/8 |
| 5,048,077 | 9/1991 | Wells | 348/14 |
| 5,192,864 | 3/1993 | McEwen et al. | 250/234 |
| 5,521,748 | 5/1996 | Sarraf | 359/321 |

*Primary Examiner*—Howard W. Britton
*Attorney, Agent, or Firm*—R. Russel Austin

[57] ABSTRACT

A display device includes a plurality of modulatable light sources providing a one-dimensional array of display-elements, and a scanning unit, carried or worn by the user, which causes the user to perceive the array as a two-dimensional image. The scanning unit is movable with respect to the array while still allowing the user to view the array as a two-dimensional image.

19 Claims, 9 Drawing Sheets

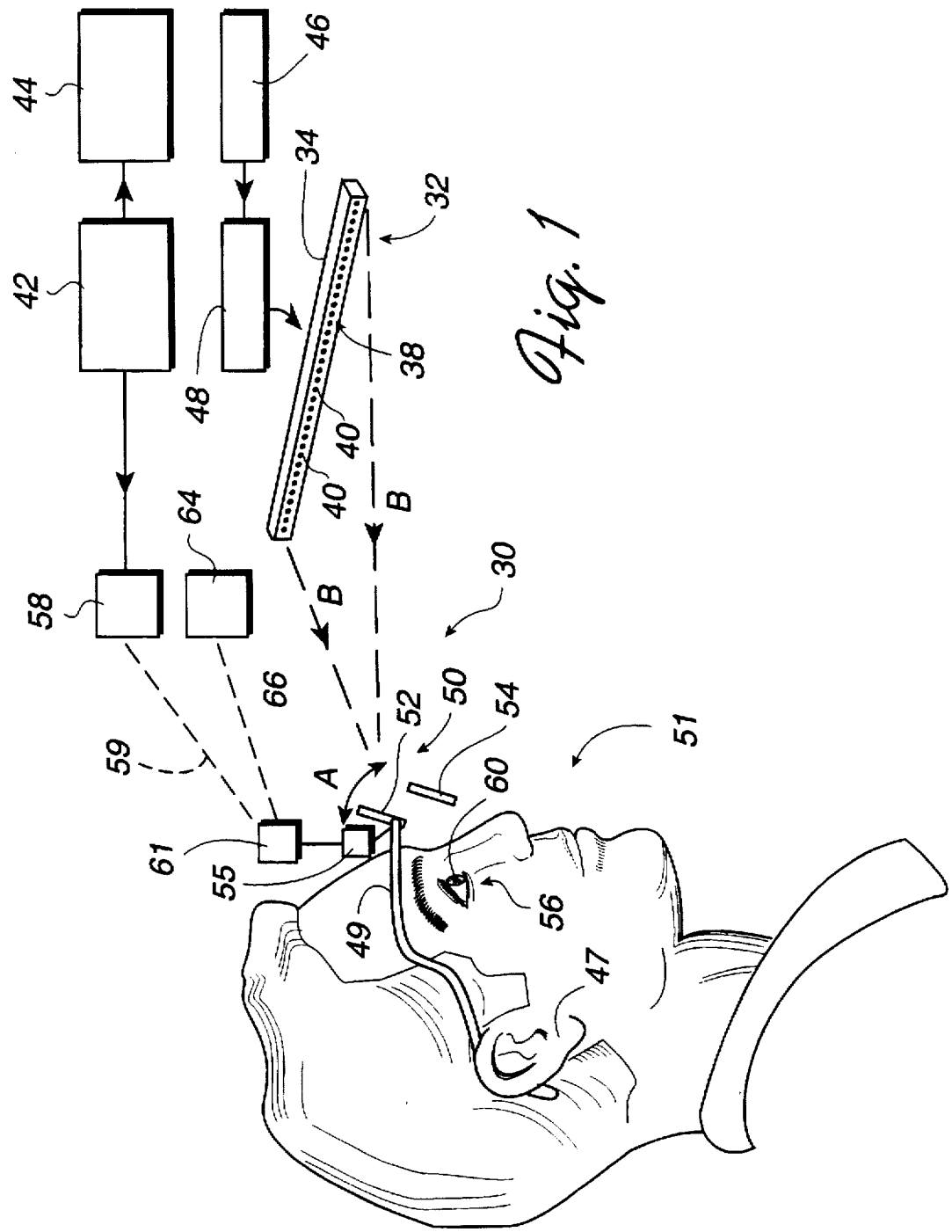

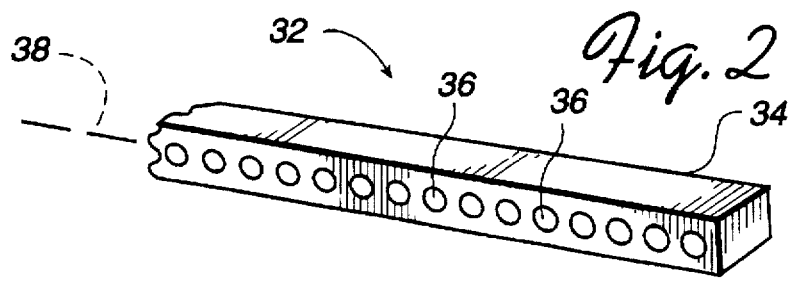
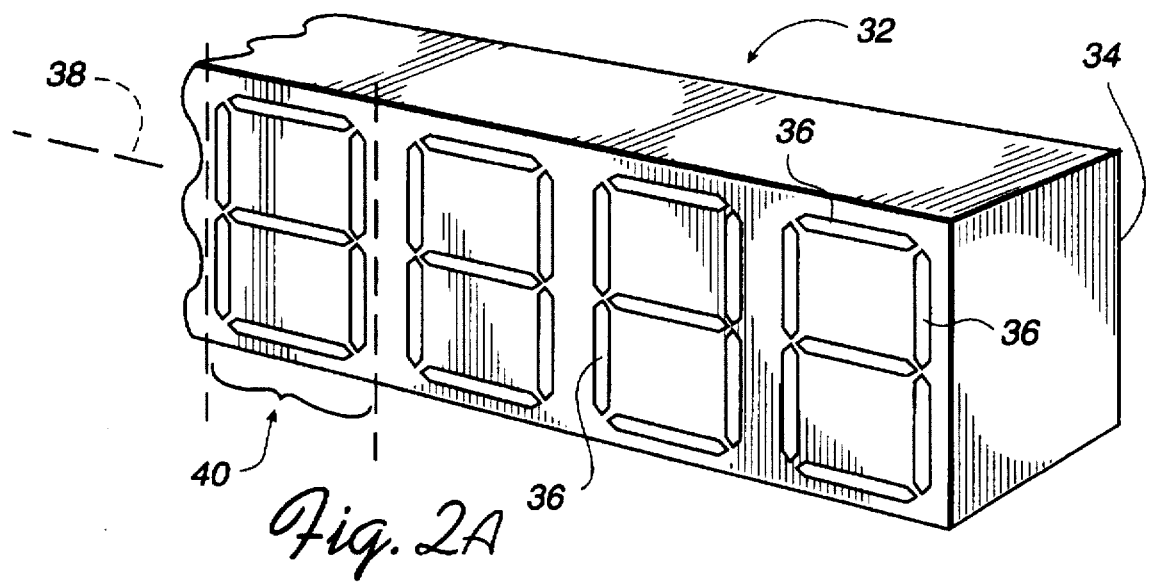
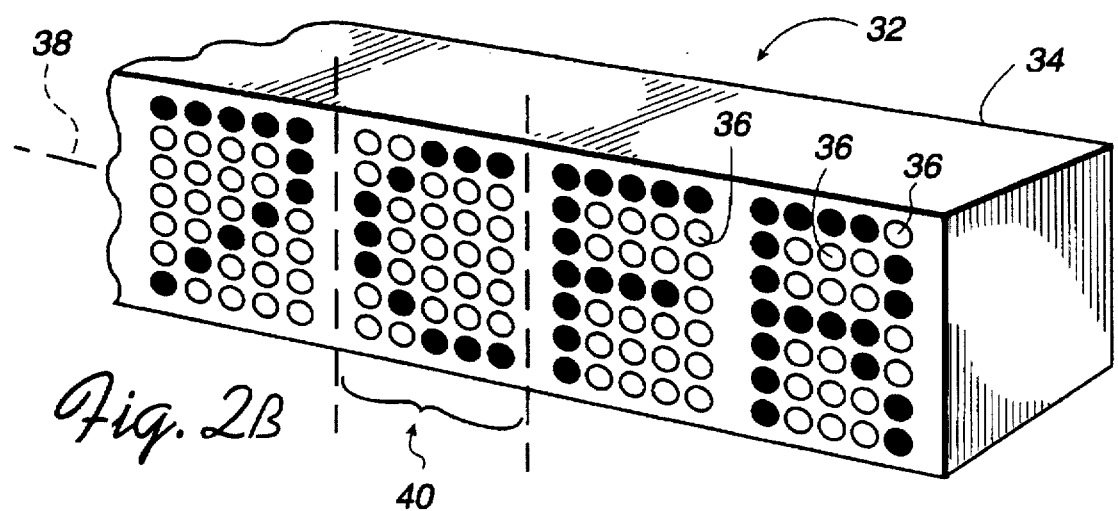

DISPLAY SYSTEM INCLUDING AN IMAGE GENERATOR AND MOVABLE SCANNER FOR SAME

TECHNICAL FIELD OF THE INVENTION

The present invention relates in general to mechanically scanned display systems. It relates in particular to a display device including a plurality of modulatable light sources providing a one-dimensional array of image elements, and a scanning device worn or carried by a user for viewing the array as a two-dimensional image, the scanning device being movable with respect to the array while still allowing the user to view the array as a two-dimensional image.

DISCUSSION OF BACKGROUND ART

Video displays have become in many respects essentially an integral part of modern life. Such displays as well as providing news or entertainment through the medium of television, provide means of monitoring interaction with computers. This interaction may be for the purpose of entertainment, or for gleaning news or information for reference and analysis, for drafting documents, or for actually computing something. Displays are found in homes, workplaces, and public places. A portable computer must include a (portable) display if it is to be useful.

Such video displays, of course, are two-dimensional displays. They have a height and a width. They take up space. For most types of video display the bigger the display the more power is needed to operate it.

Power consumption and space taken up by displays is a critical factor in battery-driven portable computers, where typically the display is the component which consumes the most power, and takes up half of the space. Thus the display adds considerably to the weight of the computer, while power consumption of the display detracts significantly from the time the computer can operate on a single battery charge.

Even if providing power is not a problem, providing space may be. For example, global positioning satellite (GPS) technology has now been advanced to the point where it is possible to provide a "moving map" type navigation system in an automobile. Providing such a system, however, requires finding space in the automobile to accommodate a video display for the moving map. The size of a normal passenger automobile dashboard provides space for only a relatively small display, typically out of a driver's direct line of vision.

Devices have been designed and constructed wherein a one-dimensional array of light sources has been modulated, either directly or by an array of light valves, and scanned to provide a two-dimensional image. By way of example, U.S. Pat. No. 5,003,300, and U.S. Pat. No. 5,048,077 disclose miniature display systems, wherein a microchip array of modulatable light-emitting diodes provides a one-dimensional array of image elements. The array is viewed via an oscillating scanning mirror and magnifying optics to create a virtual two-dimensional image having high resolution. This same principle has been applied providing headsets for "virtual-reality" computer applications.

This type of display certainly offers one solution to the above-discussed space and power consumption problems. A drawback of these systems, however, is that the use of magnifying optics, including lens elements or the like, for providing a virtual image of a useful apparent size, means that the location of a user's eye relative to the system (the exit pupil of the system) is critical in determining how accurately the image is perceived. Another drawback is that the device can only be viewed by one user at a time. This severely limits its usefulness for providing a display for family entertainment. Such a display is completely unsuitable for use in a display which is required to present information simultaneously to an uncontrollable number of people, such as a flight schedule display in an airport.

There is a need for a display system which provides a two-dimensional image to one or more viewers but which does not require the space or power of a conventional display. The system should present a real two-dimensional image to the viewer without regard to the viewer's location relative to an image-generating device. The system should be capable of presenting images in either monochrome or full color.

SUMMARY OF THE INVENTION

In one aspect, a display system in accordance with the present invention for displaying a two-dimensional image comprises a display unit including a plurality of light sources arranged to form a one-dimensional array of display elements, and an arrangement for modulating each of the light sources for representing elements of the two-dimensional image.

A user of the system carries, or wears, a scanning unit for viewing the one-dimensional array. The scanning unit is in electronic communication with the display unit, and includes a scanning device and a means for driving the scanning device.

The modulating arrangement and the scanning unit cooperate via the electronic communication for synchronizing the modulating arrangement and the scanner driving means such that the viewer perceives the one-dimensional array of display elements as the two-dimensional image. Distance between the scanning unit and the display unit may be varied while still permitting the viewer to perceive the two-dimensional image.

In another aspect of the present invention, the two-dimensional image perceived by the viewer is a real image. One dimension of this two-dimensional image, for example, width, is provided by the length of the one-dimensional array of light sources. Length of the image is provided by the angular scan range of the scanning arrangement, and the number of scan lines. The system does not include any optical elements which provide magnification of an image viewed through the scanning unit. In yet another aspect of the present invention, electronic communication between the display unit and the scanning arrangement my take place via a wireless communication link provided, for example, by a radio link or by an infrared beam link.

These above discussed aspects of the present invention provide that neither a fixed spatial relationship, nor a wired electronic connection between the scanning unit and the display unit is required. This makes the system ideal, for example, for a domestic television or "home-cinema" application as any number of viewers can view the display unit, provided, of course, one does not visually obstruct another or block another's electronic communication link. Further, as the display unit requires only a one-dimensional or linear image-element array, a real "large screen" video image can be provided by a display unit which could be accommodated in the length and thickness of a bookshelf.

BRIEF DESCRIPTION OF THE DRAWINGS

The accompanying drawings, which are incorporated in and constitute a part of the specification, schematically illustrate a preferred embodiment of the invention and, together with the general description given above and the detailed description of the preferred embodiment given below, serve to explain the principles of the invention.

FIG. 1 is a partial perspective drawing schematically illustrating one preferred embodiment of a display system in accordance with the present invention, including a display unit including plurality of modulatable light sources arranged to form a one-dimensional array of display elements, and a reflective scanning system carried or worn by a user for viewing the one-dimensional array and causing the one-dimensional array to appear as a two-dimensional display.

FIG. 2 is a fragmentary perspective view showing the display unit of FIG. 1 wherein the light sources are in a one-dimensional array and each light source forms an image element.

FIG. 2A is a fragmentary perspective view showing the display unit of FIG. 1 wherein the light sources are elongated and arranged in "figure-eight" groups in a one-dimensional array of such groups, each group for forming a display element which is a numeric character.

FIG. 2B is a fragmentary perspective view showing the display unit of FIG. 1 wherein the light sources are in 5×7 matrices arranged in a one-dimensional array of matrices, each matrix for forming a display element which is an alphanumeric character.

DETAILED DESCRIPTION OF THE INVENTION

Figure 2C:
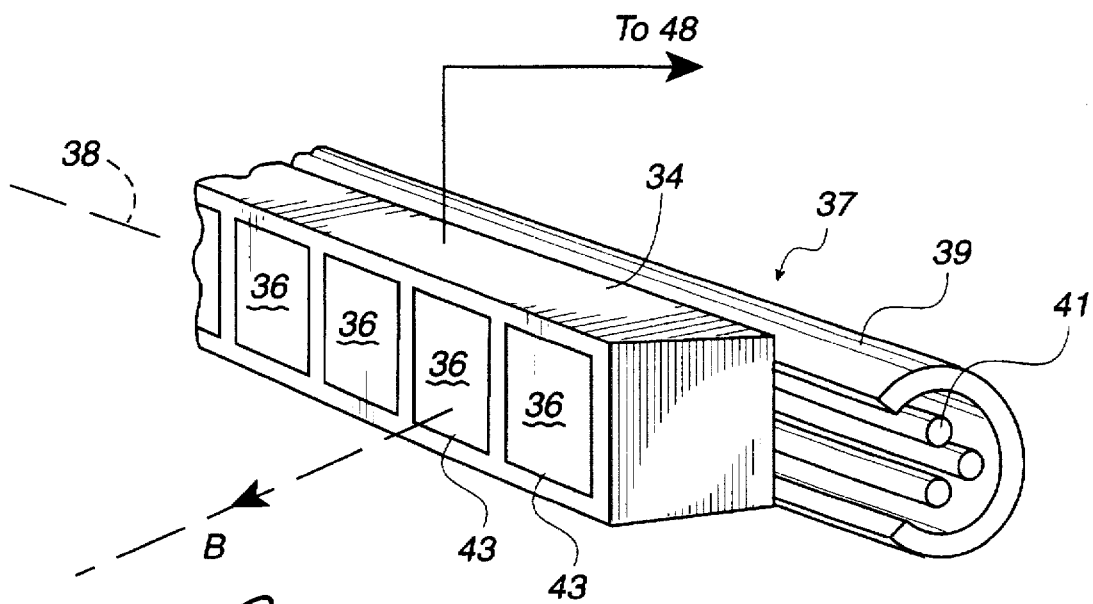
FIG. 2C is a fragmentary perspective view showing the display unit of FIG. 1 wherein the light sources are individually addressable transmissive light-valves illuminated by a continuous light source.

Turning now to the drawings, wherein like features are designated by like reference numerals, FIGS. 1 and 2 show one preferred embodiment 30 of a display system in accordance with the present invention, suitable for providing a video display for use, for example, in a room or hall of a building. Display system 30 includes a display unit 32 having a fixture or housing 32 in which a plurality of light sources 36 (see FIG. 2) is arranged to form a linear array 38 of image-elements or pixels 40. Light sources 36 are preferably light-emitting diodes (LEDs) or semiconductor lasers, which can be modulated according to information to be displayed by the image-elements to which they correspond.

The array form of FIG. 2 is particularly suitable for high resolution video and graphics where each light source 36 is a resolution element. An alternate form suitable for displaying numeric characters only is illustrated in FIG. 2A. Here, light sources 36 are elongated and arranged in well-known figure eight groups or display elements 40 each on of which can represent a character, zero through nine. Such a character being a display element. Here, array 38 is a one-dimensional array of numeric characters. A two-dimensional display of such characters would be presented one line of characters at time, and viewed as a two-dimensional character array via a scanning unit 50. A more complex arrangement is presented in FIG. 2B where 5×7 matrices of light sources 36 are used to form alphanumeric characters.

Figure 2D:
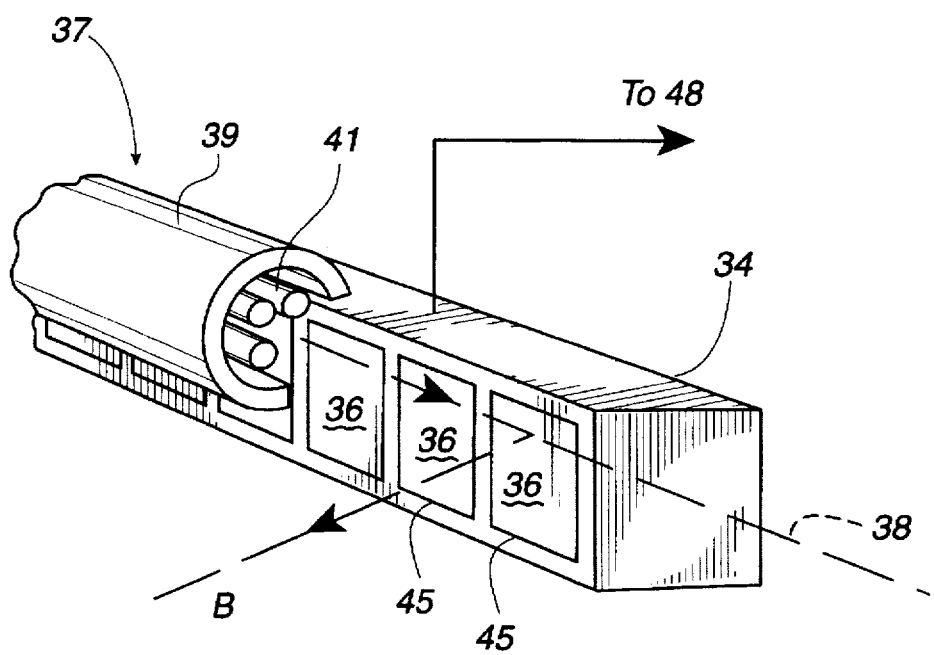
FIG. 2D is a fragmentary perspective view showing the display unit of FIG. 1 wherein the light sources are individually addressable reflective light-valves illuminated by a continuous light source.

Alternative methods of providing an array of modulatable light sources from an array of individually addressable light valves illuminated by a common continuous light source are illustrated in FIGS. 2C and 2D. In FIG. 2C, display unit 32 includes a continuous light source 39 which is formed from an elongated cylindrical reflector 41 and one or more strip light sources 41. Housing 34 includes a plurality of individually addressable light valves 43, such as liquid crystal light valves, which are controlled by modulating units 42,44, 46, and 48, to modulate light from continuous light source 37 incident thereon. Light valves 43 thus arranged are a functional equivalent of above described arrays 38 of individual light sources 36. In FIG. 2D, housing 34 includes a plurality of individually addressable reflective light valves 45, such as are found one or more well known spatial light modulators. Light valves 45 are controlled by modulating units 42,44, 46, and 48, to modulate light from continuous light source 37 incident thereon, and are illuminated by a continuous light source 37. Thus arranged, light valves 45 provide another functional equivalent of above described arrays 38 of individual light sources 36.

Figure 3:
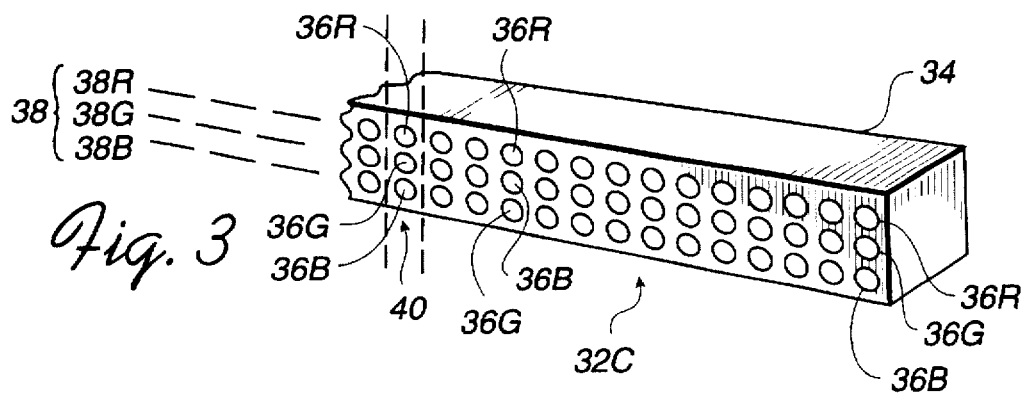
FIG. 3 is a fragmentary view showing the display unit of FIG. 1 wherein the light sources are arranged in red, green, and blue, superposed, one-dimensional arrays of light source and adjacent red, green, and blue light sources form an image element.

Referring now to FIG. 3, yet another alternate arrangement of light sources in display unit 32C is illustrated, for forming a color two-dimensional display. Three superposed one-dimensional arrays 38R, 38G, and 38B, formed from respectively red 36R, green 36G and blue 36B, light sources are illustrated. Arrays 38R, 38G, and 38B together form one-dimensional array 38 of image-elements 40. Here, an image-element 40 includes corresponding red 36R, green 36G and blue 36B light sources from arrays 38R, 38B, and 38G. This is one, but not a limiting, arrangement of light sources for providing a two-dimensional color image in display system 30.

Referring again to FIG. 1, associated with display unit 32 is an image input unit 42. Image input unit 42 may be a video terminal or receiver for receiving broadcast or cable television images, a video recorder (disc or tape), or simply a memory device in which programmed video or graphic information is stored for display. A digital processing unit and frame buffer 44 receives the video or graphic data to be displayed and modulates light sources 36 of linear array 38, via a line buffer 46 and an amplitude/pulse converter 48, in accordance with this data. Linear array 38 represents, sequentially, different lines of a M×N display where M is the number of display-elements per line, and N is the number of lines in the display. The width of display unit would be the same as the width of a "corresponding" conventional video display. Display unit 32 has a resolution depending on the magnitude of M and N, i.e., the number and dimensions of light sources 36 and the number of lines of characters or image-elements in the display.

A viewer 51 of display unit 32, carries, or optionally wears incorporated in eyewear (illustrated for simplicity in FIG. 1 by a frame-member 49 hooked about viewer's ear 47) a scanning unit 50, for viewing display unit 32 and causing it to appear as a two-dimensional display. Although only one scanning unit 50 is illustrated, two such units may be used, one for each of the viewer's eyes.

Scanning unit 50 includes an oscillating or scanning mirror 52 having a driver 54. Scanning mirror 52 may be driven resonantly by a sinusoidal waveform, or servo-driven in response to an arbitrary waveform. When viewer 51 faces display unit 32, scanning mirror 52 directs light from display unit 32 (indicated in FIG. 1 by extremity rays B) via a fixed mirror 54 to the eye 56 of viewer 51. Scanning mirror 52 is arranged to oscillate, as indicated by arrow A, such that the viewer's view of display unit 32 is swept, angularly vertically through the viewer's field of view. Array 38 displays sequential lines of the M×N image as the view is swept by oscillating mirror 52.

Oscillating or scanning mirror arrangements are well-known by those familiar with the art to which the present invention pertains. Accordingly, a detailed description of such a mirror scanning mirror arrangement is not presented herein. Further, it should be noted that the use of a multi-faceted rotating polygonal mirror in place of oscillating mirror to provide reflective scanning is not precluded. Those familiar with the art, however, will recognize that a rotating polygonal mirror having the same effective aperture as scanning mirror 52 would occupy more physical space than scanning mirror 52. Because of this scanning unit 50 would be physically more bulky.

It should be also noted here that electronic components associated with display unit 32 and scanning device 50 are not restricted in form to the separate functional blocks connected as shown in FIG. 1 for convenience of description. Those skilled in the electronics art will be able to derive other circuitry or microprocessor arrangements which perform the same functions, using more or less circuit blocks, similarly or differently connected, without departing from the spirit and scope of the present invention.

Further, it will be recognized that electronic components depicted in FIG. 1, and other drawings referred to herein, do not have to be incorporated in a single unit with the device with which they are associated. Finally, but not exhaustively, it will be recognized that while FIG. 1 depicts a horizontal display element array vertically scanned, principles of the present invention are equally applicable to a vertical display element array, horizontally scanned.

Continuing now with reference to FIG. 1, the oscillatory motion, or any other scanning motion, of scanning mirror 52 must be synchronized with the generation of image display lines by frame buffer and digital processing unit 44 and image-element array 38. For example, lines 1 through N should be displayed from beginning to end of a half-cycle or a full-cycle of oscillation. Also, if the oscillatory motion of scanning mirror 52 is sinusoidal, the rate at which image lines are generated during a half-cycle must be correspondingly varied, constantly, to accommodate the constant reduction of sweep rate of the viewer's view of array 38, from the "zero-crossings", towards the extremities of the oscillatory cycle. This provides that sequential image lines are seen by viewer 51 at equal physical spacing increments.

Further, for a fixed angular excursion of scanning mirror 52, the perceived height of the image will increase with increasing distance of the viewer from the array. The width of a two-dimensional image perceived by viewer 51, however, will be the same as the perceived width of light-source array 38 at that distance, whatever the distance.

This would cause the aspect ratio of the perceived two-dimensional to vary with distance. To eliminate such aspect ratio variation, it is necessary to control the angular excursion of scanning mirror 52 in accordance with the distance of the viewer (scanning unit 50) from the display unit 32.

Synchronization of scanning unit 50 (scanning mirror 52) with array 38 is achieved by providing a data or electronic communication link 56 between drive unit 55 of oscillating mirror 52 and video source 42. This is achieved in a system 30 via synchronization unit 58, associated with display unit 32, and a transmitter/receiver/processor 61 associated with scanning device 50. This data link is preferably a wireless communication link. As typically relatively little information is required for synchronization, such a wireless communication link could be via an optical, for example, infrared, beam link of the type commonly used in remote control devices for television sets, video cassette recorders and the like. A wireless link could also be established by a radio link. In a simplest form, the link could be a so-called "hard-wired" link, provided by a flexible wire or cable to allow relative movement between the viewer and the display. The term "electronic communication" as used in this description and appended claims is intended to encompass all such data or communication link options.

It is not critical in display system 30 whether scanning mirror drive unit 55 or synchronizing unit 44 has the "master" role (the other having the "slave" role) in synchronizing display unit 32 and scanning unit 50. Clearly, it is preferable that only essential functions of the operation of the display system are undertaken by scanning unit 50. This reduces the size of the unit and the space required for incorporating such a unit in eyewear. The smaller scanning unit 50, the closer could be the appearance of the eyewear to conventional corrective or protective eyewear, recognizing, of course, that the term "conventional" here is subject to interpretation due, at least, to the whims of fashion.

It should be noted here that scanning device 50 may be placed sufficiently close to the wearer's eye that fixed mirror 54 need be little bigger than the pupil 60 of the users eye. Mirror 54 may thus be positioned with respect to the user's eye such that the user could look at the mirror to view the display (as intended), or over the mirror to view something other than the display, or, of course, to view the display as simply a linear array. Learning to use eyewear incorporating a scanning device 50 subconsciously would not be significantly more difficult, if more difficult at all, than learning to use conventional multifocal or progressive corrective lenses, subconsciously.

For viewing a display wherein light sources 36 are of only one color, mirror 54 can be formed on a transparent substrate coated with a selectively reflective coating which reflects only the color of the light sources and transmits all other colors. This allows the user to look at the mirror and view array 38 as a two-dimensional image, while viewing the environment of the array normally through the mirror.

For providing aspect ratio control, a rangefinder device 64 is associated with display unit 32. One preferred rangefinding device is an ultrasonic device of the type incorporated in certain photographic cameras which estimates distance to a target by transmitting an ultrasonic (or acoustic) "click" or pulse. Distance is determined from the elapsed time between a start-time set by an electronic pulse initiating the transmitted click and a stop-time or arrival-time set by detecting an echo of the click.

Synchronization unit 58 initiates an ultrasonic click from rangefinder device 64. This click is acoustically transmitted to receiver 61 of scanning unit 50 as illustrated by dotted line 66. Receiver 61 includes a microphone for receiving the ultrasonic click and generating an arrival signal therefrom. An electronic signal marking the initiation of the pulse is also transmitted via data link 59 to receiver/processor 61. Receiver 61 determines distance from display unit 32 from the time delay between reception of the electronic pulse and the ultrasonic click (the arrival signal). The distance determined is used to control the angular excursion of scanning mirror 52 such that viewer 51 sees an image having the correct aspect ratio, even when the distance of display unit 32 from the viewer is varied.

Referring now to FIG. 4 and FIGS. 5A–C, an alternate arrangement for providing aspect ratio control is illustrated. Here, a scanning unit 50A includes oscillating and fixed mirrors 52 and 54, as in scanning device 50. Fixed mirror 54 in scanning unit 50A is partially transmitting, such that a portion of light B from display unit 32 is transmitted therethrough, and is focussed by a lens 68 to scan a two-dimensional image onto a quadrant detector 70. This scanned two-dimensional image is a replica of a two-dimensional image which would be perceived by viewer 51.

Figures 5A, 5B, 5C:
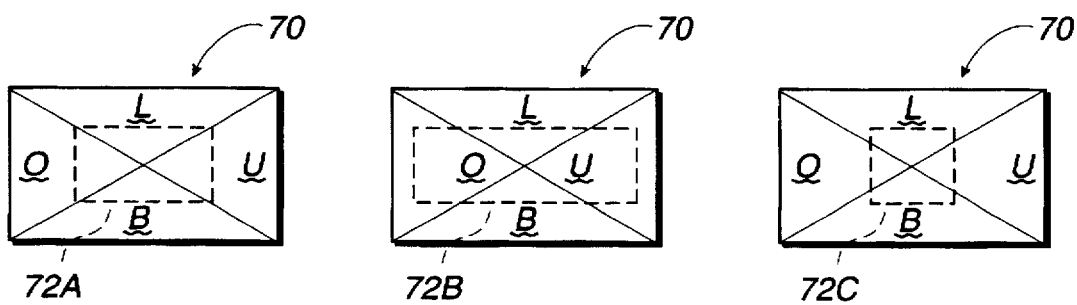
FIGS. 5A-C are plan views of the quadrant detector arrangement of FIG. 4, schematically illustrating detector and error signal generation features of the aspect ratio control arrangement of FIG. 4.

Quadrant detector 70 comprises four separate detector segments R, L, O, and U. FIG. 5A illustrates a condition where an image 72A provided by lens 68 has the correct aspect ratio. In this condition signals from quadrants R, L, O, and U are arranged to be equal at some nominal aspect-ratio, and an error signal E=(R+L)−(O+U) is zero. As scanning device 50A is moved away from display unit 32, the image formed by lens 68 will tend to increase in height as illustrated in FIG. 5B. In this condition (O+U) will be greater than (R+L) and a negative error signal will be generated by receiver unit 61. The negative error signal will be used to control drive unit 55 to reduce angular excursion of oscillating mirror 52, until the image has the correct aspect ratio, i.e., the error signal is zero. If scanning unit 50A is moved closer to display unit 32, the image height will tend to reduce, as illustrated in FIG. 5C. Then (R+L) will exceed (O+U) producing a positive error signal E. This signal will be used to increase the angular excursion of oscillating mirror 52 until the correct aspect ratio is restored.

Figure 4:
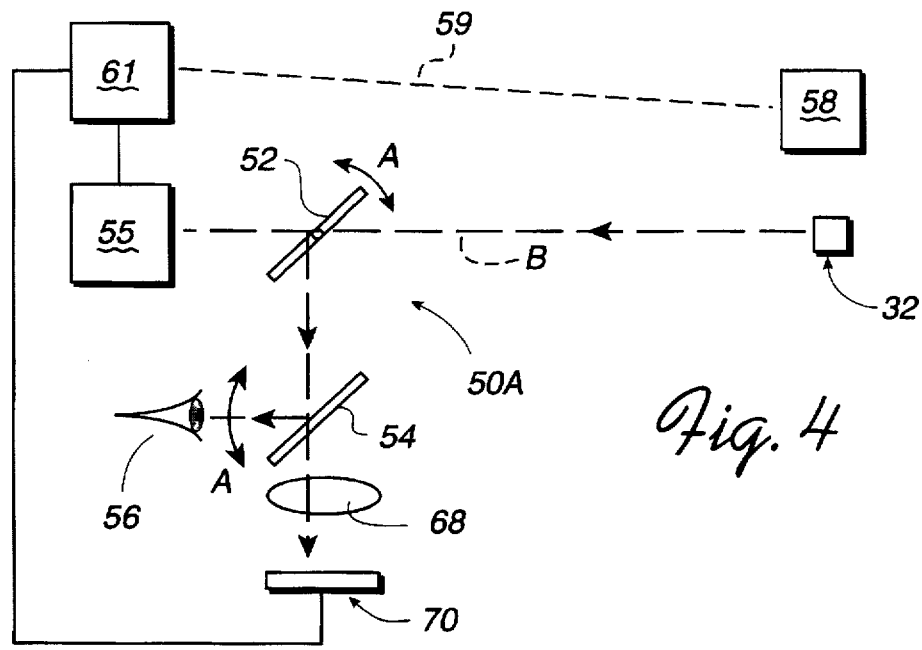
FIG. 4 is a partial perspective drawing schematically illustrating another preferred embodiment of a display system in accordance with the present invention, similar to the display system of FIG. 1, but including a quadrant photo-detector arrangement for providing aspect ratio control for the two-dimensional display.

The aspect ratio control arrangement of FIG. 4, while requiring that more components be provided in a scanning unit 50A than are required in the ultrasonic arrangement of FIG. 1, provides for a smoother and more accurate control of aspect ratio. Advantageously, also, a rangefinder device and necessary control circuitry are not required for display unit 32. Communication of synchronizing information, however, is still required. In the arrangement of FIG. 4, it is also possible to communicate synchronizing information via an electronic communication link established from modulator unit 58 via display unit 30 over light rays B therefrom, i.e, via an optical electronic data link. In this case, synchronization data is extracted by from signals generated by light incident on one or more quadrants of quadrant photodetector 70. The communication data being transmitted to receiver 61, together with above-described aspect ratio signals.

Display system 30, has an important advantage over prior-art display systems which generate a perceived two-dimensional image from a one-dimensional array of light sources. This advantage is that no magnifying optics (prescribed corrective lenses for a user aside), i.e., refractive or reflective optical elements having optical power, are necessary to view the display. What viewer 51 sees is a real two-dimensional image having the same width as the one-dimensional array of light sources 38 is long. Because of this, in a scanning device and display unit combination, including an aspect ratio control arrangement as described above, a viewer can view display unit 32 at any distance therefrom that would be convenient for an actual two-dimensional display of the same width and aspect ratio, and having the same resolution as the as display unit 32. If viewer 51 approached display unit 32 closely, it may not be possible to see the entire display without head movement, and individual image-elements may become discernable.

This would be no different however than were the perceived two-dimensional display an actual two-dimensional display of the same size and resolution.

It is also possible for a viewer to view display unit 32 at angles of incidence thereto other than normal, i.e., other than perpendicular to the display unit. It should be noted, however, that at close viewing distances, potentially unacceptable trapezoidal distortion of the perceived two-dimensional display may result if display unit 32 is viewed at incidence angles other than normal. Certainly, if display unit 32 were viewed at an angle other than normal thereto, the perceived two-dimensional display would appear to be foreshortened in one-dimension or another, as would an actual two-dimensional display. Nevertheless, the perceived two-dimensional display would be in focus, because only the viewers eye would be doing the focussing. Because of this, a display unit 32, including aspect ratio control, can be simultaneously viewed by a number of viewers in a room, at differing distance and angle to the display, in much the same way as a conventional television screen can be viewed by a number of people in a room.

Figure 6:
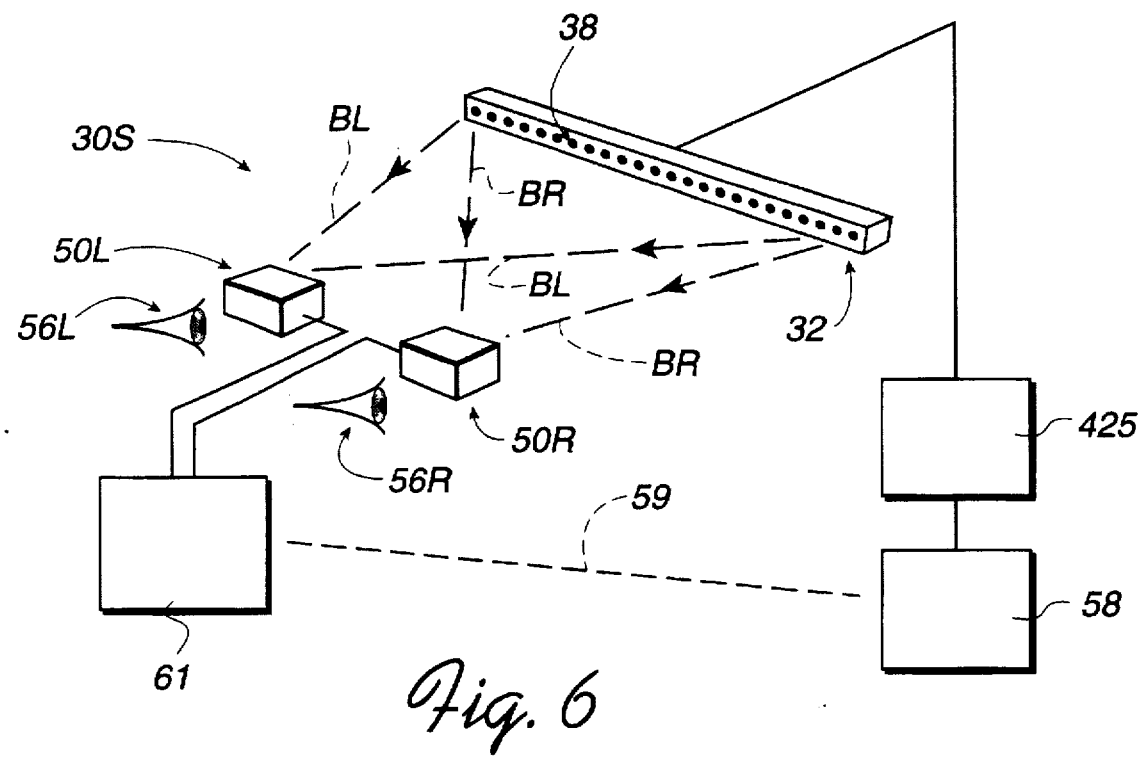
FIG. 6 is a partial perspective drawing schematically illustrating yet another preferred embodiment of a display system in accordance with the present invention including a display unit including plurality of modulatable light sources arranged to form a one-dimensional array of image elements, and right and left reflective scanning units carried or worn by a user for viewing the one-dimensional array and causing the one-dimensional array to appear as a stereoscopic two-dimensional display.

Turning now to FIG. 6, a display system 30S for providing a stereoscopic two-dimensional image from a one-dimensional array of light sources is illustrated. Display unit 32 is as described above for the display system of FIG. 1. In display system 30S, two scanning units 50R and 50L are provided for respectively the right eye 56 and left eye 57 of a viewer. Associated with display unit 32 is a source 42S of stereoscopic video display information. Synchronization data for the stereoscopic display information is communicated by synchronization unit 58 to a receiver/processor unit 61 which interprets the information and provides drive signals based on this information to scanning units 50R and 50L.

Light source array 38 is modulated to provide, sequentially, all lines of a right video frame and all lines of a left video frame. Scanning units 50R and 50L operate as discussed above for scanner 50 to cause the one-dimensional array 38 to appear as a two-dimensional video frame. The scanners are arranged, however, such that one is blanked while the other scans, such that left eye 56L and right eye 56R see respectively only left and right video frames (indicated in FIG. 6 by broken lines BL and BR).

Figure 7:
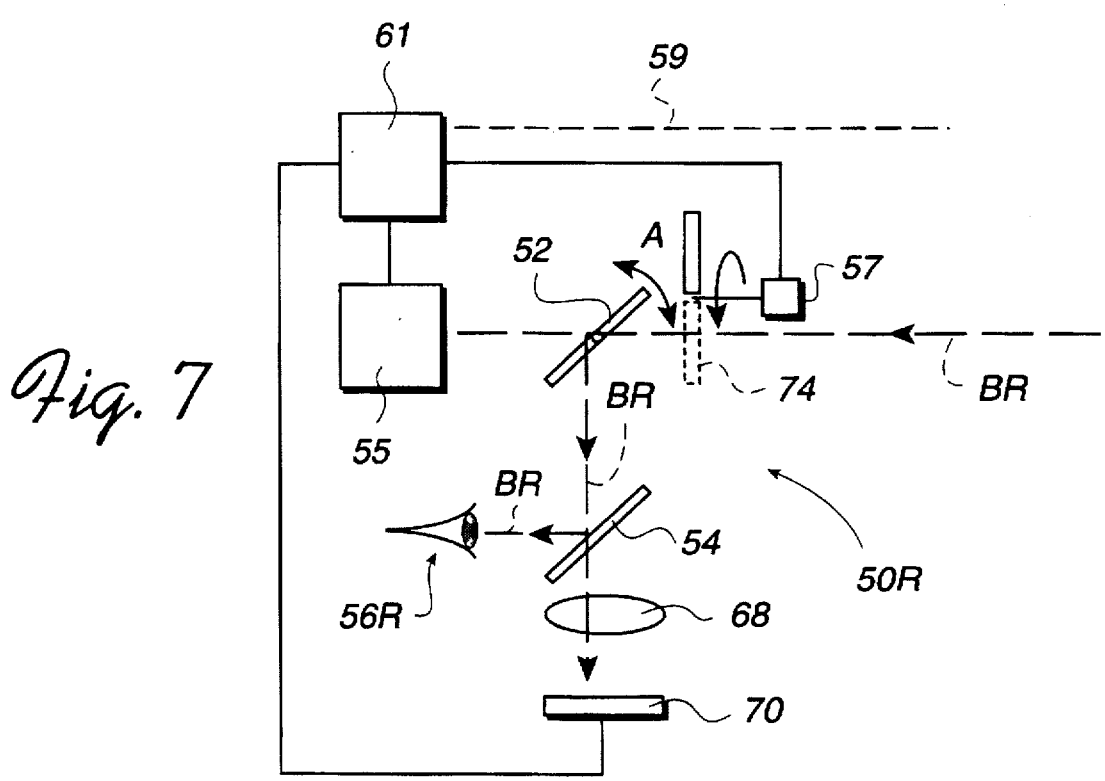
FIG. 7 is a general cross-section view schematically illustrating one example of a scanning device suitable for use in the display system of FIG. 6.

Referring now to FIG. 7, one preferred arrangement of a right-eye scanning unit 50R for system 30S is illustrated. Here, scanning mirror 52 is driven sinusoidally (resonantly) at a frequency equal to the combined frame rate of left and right video frames. A rotating shutter (shown open in FIG. 7) is driven by motor 57 at the same frequency as scanning mirror 52 and is synchronized with a corresponding shutter in scanning unit 50L (configured otherwise identically to scanning unit 50R) such that one of the shutters is open while the other is closed.

Those familiar with the art to which the present invention pertains will recognize that if mirror 52 is sufficiently light, it may be servo driven, non-resonantly, according to a given non-sinusoidal driving waveform. Such a mirror could be driven, for example, by a "sawtooth" waveform having a ramp portion for sweeping the mirror to make a scan, and a constant or "holding" portion during which the mirror is held stationary at an angle such that array 38 is not visible to the viewer, waveforms in right and left scanning units being synchronized such that a ramp portion of one occurs during a holding portion of the other. This arrangement would provide for a more compact scanning unit, as a separate shutter would not be required.

Figure 8:
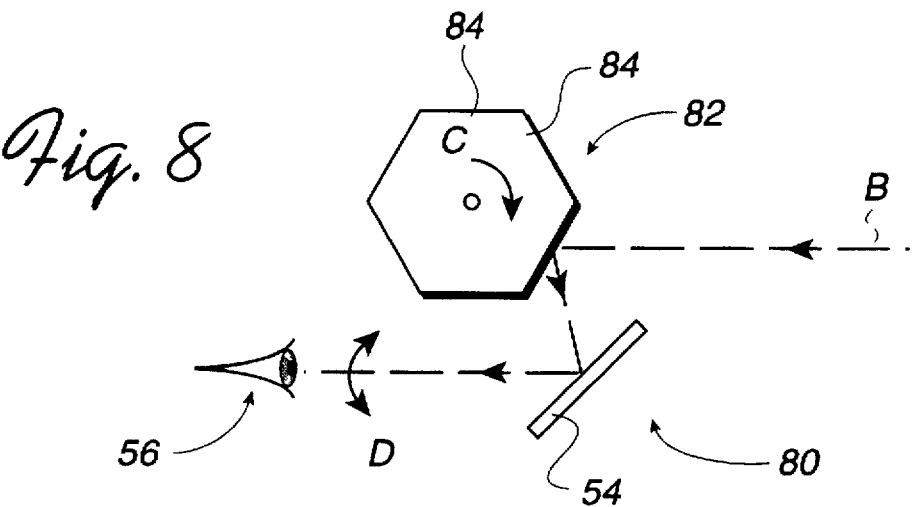
FIG. 8 is a general cross-section view schematically illustrating a rotating-polygon, periscope-type reflective scanner for a scanning unit in accordance with the present invention.

Before proceeding with a discussion of various embodiments of a display system in accordance with the present invention, a brief discussion of some alternative scanning devices suitable for a scanner unit 50 in accordance with the present invention is presented. Referring to FIG. 8, a periscope-type, rotating-polygon reflective scanning unit 80 includes a rotating reflector member 82 which provides scanning action. Reflector member 82 has a hexagonal cross-section and having reflective longitudinal faces 84. Light B from display unit 32 is reflected from a face 84 towards mirror 54 and reflected from mirror 54 towards a user's eye 56. As reflector member 82 rotates as indicated by arrow C, light B is angularly scanned through the user's field of view as indicated by arrow D.

The scanner arrangement of FIG. 8 has the advantage that a rotational drive system for reflector member 82 is simpler, potentially more reliable, and essentially vibration free, compared with an oscillating drive mechanism required for scanning mirror 52 of scanning unit 50 (see FIG. 1). Further, light B is scanned in one direction only so a new scan is generated essentially immediately after a previous scan is completed. A disadvantage is that rotating reflector member 82 is significantly bigger and heavier than an oscillating mirror or servo-driven mirror of the same aperture. Further, rotating reflector member 82 can not be used for compensating changes in aspect ratio resulting from changes in viewer distance form display unit 32.

Figure 9:
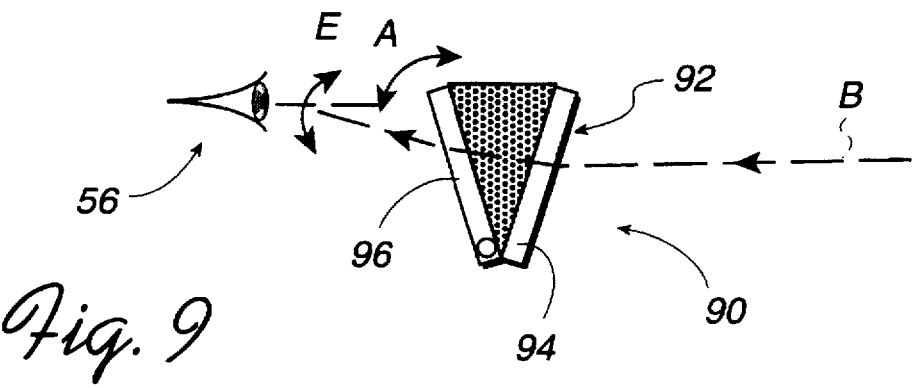
FIG. 9 is a general cross-section view schematically illustrating a variable-angle, prismatic, transmissive scanner for a scanning unit in accordance with the present invention.

Referring now to FIG. 9, a prismatic transmissive scanning unit 90 may be formed by using a deformable or variable-angle prism 92 to provide scanning action. Prism 92 is formed from transparent, plane parallel, front and rear members 94 and 96. Members 94 and 96 are arranged face to face with at an angle to each other to form a V-shaped shaped trough which is filled with a liquid or preferably with an oil-extended transparent elastomer, preferably having an oil:elastomer ratio greater than 85:15. Such an elastomer is relatively easily deformed, and has an elastic memory, but, despite the high oil proportion will not flow. Such elastomers and their preparation are discussed in U.S. Pat. No. 4,618,213. Member 96 is oscillated, as illustrated by arrow A, in the manner of scanning mirror 52 of scanning unit 50. This oscillatory motion causes light transmitted through prism 92 to be scanned across a viewer's field of view, as illustrated by arrow E. Scanning arrangement 90 has the advantage that it has only one optical element, and is, as a result, more compact. However, more power is required to drive prism 90, than an oscillating mirror, and the available scan range practically is less than is possible with an oscillating mirror.

Figure 10:
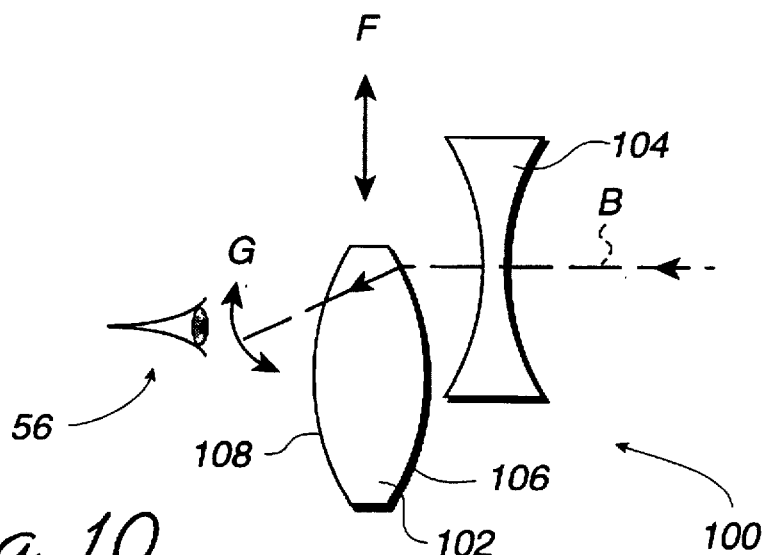
FIG. 10 is a general cross-section view schematically illustrating a reciprocating-lens, transmissive scanner for a scanning unit in accordance with the present invention.

Finally, but not exhaustively, yet another scanning unit 100 is illustrated in FIG. 10. Scanning unit 100 includes positive and negative transparent lens elements 102 and 104 respectively. The radii of curvature of elements 102 and 104 is selected such that the combination of elements has zero optical power, i.e., provides no image magnification. Positive element 102 is driven reciprocally, as indicated by arrow F, from an axially aligned position to an axially misaligned position as illustrated. Angular deflection of light transmitted through element 102 increases from zero in the aligned position to some maximum angle at maximum misalignment. This causes an angular scan of light B across a viewer's field of view as indicated by arrow G. Those familiar with the optical art will recognize of course that element 102 could be fixed and element 104 reciprocated to provide the same scanning mechanism.

As discussed above, an important feature of a display system in accordance with the present invention is that the display unit for the system need be only high enough to accommodate, at most, three one-dimensional LED or semiconductor laser arrays. Because of this, it can be accommodated in a small fraction of the space required for an actual two-dimensional array of the same width. Set forth below is a brief description of embodiments of the present invention which take advantage of this feature.

Figure 11:
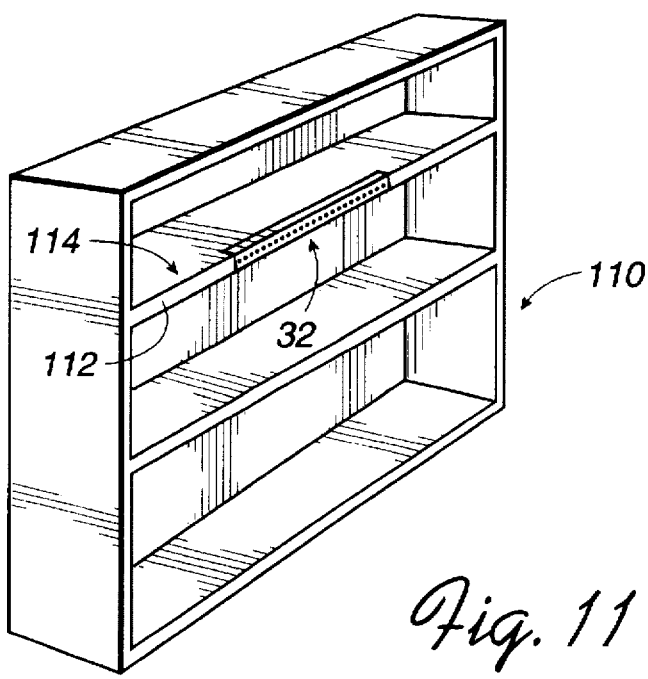
FIG. 11 is a perspective view schematically illustrating a display unit for a display system in accordance with the present invention incorporated in a bookshelf.

In FIG. 11, a book or storage shelf unit 110 is illustrated. A display unit 32 including above discussed electronic circuitry for driving the display and communicating with a scanner unit, is easily accommodated in an edge 112 of a shelf 114. Such a placement of display unit 32 could be used for accommodating a domestic television display in bookshelves. Such a placement could also be used in supermarket display shelves for providing pricing, special offer, or like information.

Figure 12:
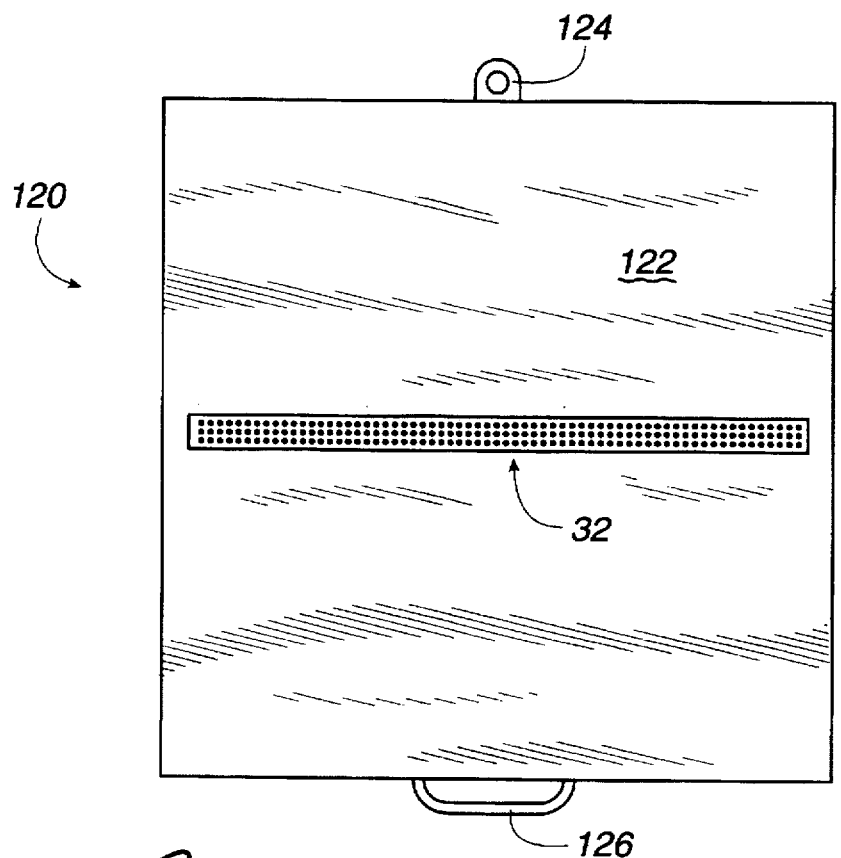
FIG. 12 is a front elevation view schematically illustrating a display unit for a display system in accordance with the present invention incorporated in a "pull-down" collapsible screen.

In FIG. 12, another arrangement 120 of a display unit for a display system in accordance with the present invention, suitable for a "home theater" presentation, or for a display in a lecture hall or classroom is illustrated. Here, a display unit 32 is shown attached to a "pull-down" screen 122 of the type which is retracted by spring action into roll form for storage when not in use. The screen may be may be hung on a wall by hook 124, a handle 126 is provided for unrolling the screen. Unlike a conventional projection screen, screen 122 is preferably finished matt-black. This will provide for maximum contrast and color saturation in the perceived two-dimensional array.

Figure 13:
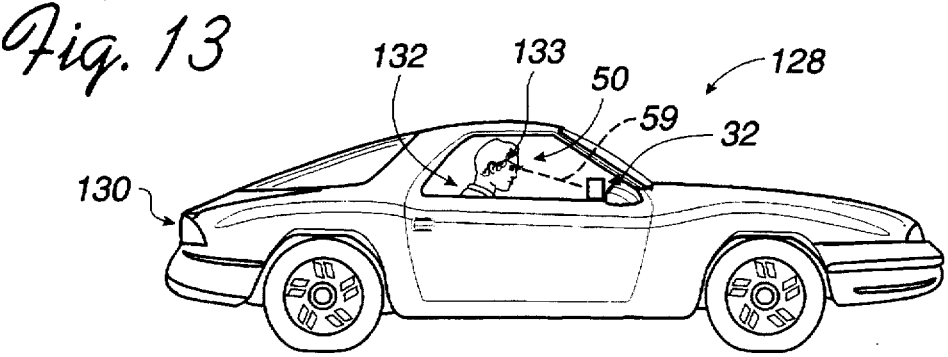
FIG. 13 is a side elevation view schematically illustrating a display unit for a display system in accordance with the present invention mounted on the dashboard of an automobile.
Figure 14:
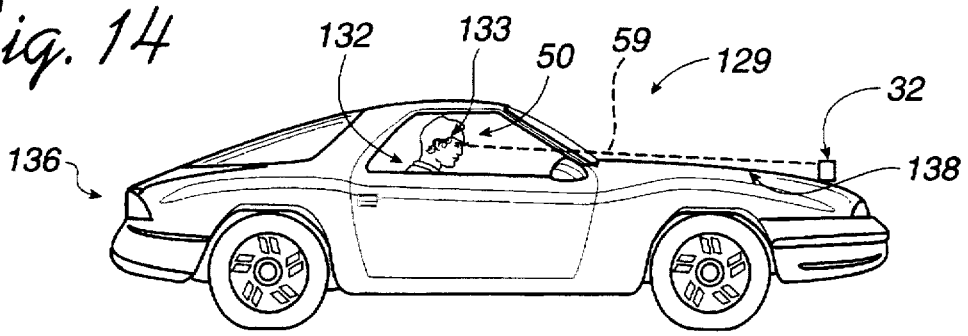
FIG. 14 is a side elevation view schematically illustrating a display unit for a display system in accordance with the present invention mounted on the hood of an automobile.

A display system in accordance with the present invention may be used advantageously in an automobile. In FIG. 13, for example, an embodiment 128 of a display system in accordance with the present invention is configured for use in an automobile 130. System 128 has a display unit 32 mounted on the dashboard (not shown), while a driver 132 wears eyewear 133 including a scanner unit 50 for viewing the display unit. In FIG. 14, another embodiment 129 of a display system in accordance with the present invention, for an automobile 136, has a display unit 32 mounted on hood 138 of the automobile. Driver 132 wears eyewear 133 including a scanner unit 50 for viewing the display unit.

In systems 128 and 129 any driver of the automobile will view display unit 32 from about the same distance. As variation in position in the automobile from one driver to another driver will be only a fraction of the mean distance of a driver from the display unit, and as such systems would be used primarily for displaying data rather than graphic images, aspect ratio control could be omitted from the system without detracting from its effectiveness.

Figure 15:
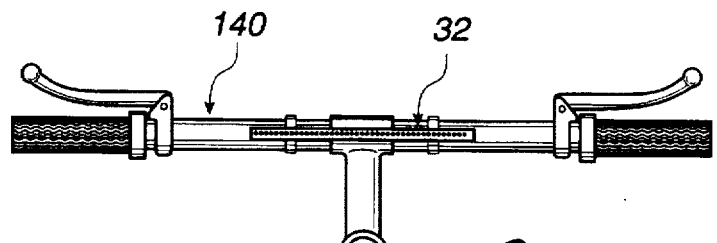
FIG. 15 is a plan view from above schematically illustrating a display unit for a display system in accordance with the present invention mounted on bicycle handlebars.

Clearly, use of systems such as the systems of FIGS. 13 and 14 is not limited to automobiles, but may be used in trucks, buses, fighting vehicles, boats, aircraft and the like. A display system in accordance with the present invention is also useful for two-wheeled vehicles such as bicycles and motor cycles. As illustrated in FIG. 15, for example, the "one-dimensional" nature of a display unit 32 makes it easy to mount on handlebars 140 of a bicycle or motor cycle. Here, as in the systems of FIGS. 13 and 14, a rider of the vehicle would typically wear eyewear including a scanning unit for viewing the display.

Figure 16:
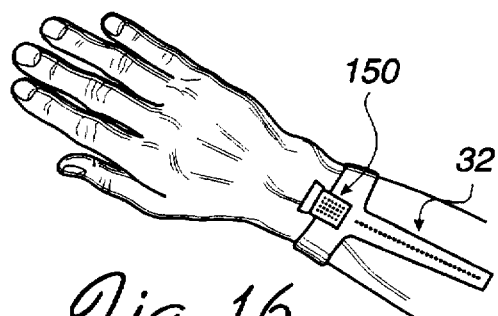
FIG. 16 is a general view schematically illustrating a display unit for a display system in accordance with the present invention incorporated in an interactive display device worn on a wrist.
Figure 17:
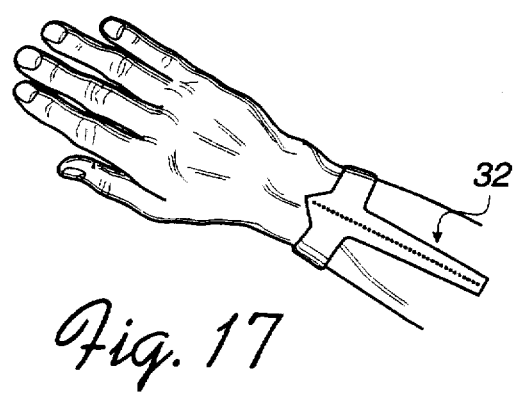
FIG. 17 is a general view schematically illustrating a display unit for a display system in accordance with the present invention incorporated in a non-interactive display device worn on a wrist.

Above-discussed display systems in accordance with the present invention have included a display unit fixedly mounted on a wall, furniture or a vehicle, and a scanner unit worn or carried by a user for viewing the display unit. A display system in accordance with the present invention, however, may be worn or carried in its entirety by a user. Such a system may include a display unit 32 worn on a wrist as illustrated in FIGS. 16 and 17. In FIG. 16 an interactive display, for example, a computer or calculator display, is illustrated, having a miniature keypad 150 for data entry. In FIG. 17, a non-interactive display allows a wider display than the display of FIG. 16.

Figure 18:
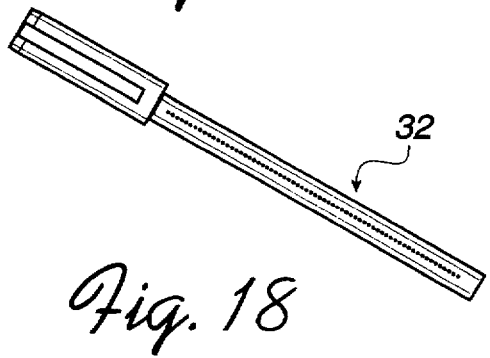
FIG. 18 is a general view schematically illustrating a display unit in for a display system accordance with the present invention incorporated in a pen.

In a "user-portable" display system in accordance with the present invention it is not necessary to wear the display unit. A display unit 32 may be incorporated in other items normally carried by a user such as a pen, as illustrated in FIG. 18. A "full-size" two-dimensional computer display could be provided by a display unit 32 incorporated in a briefcase and a scanner carried or worn by the user of the briefcase. Such a system would significantly ease the carry-on luggage burden for those business persons who now must routinely carry both a conventional briefcase and a so-called "portable" computer.

Figure 19:
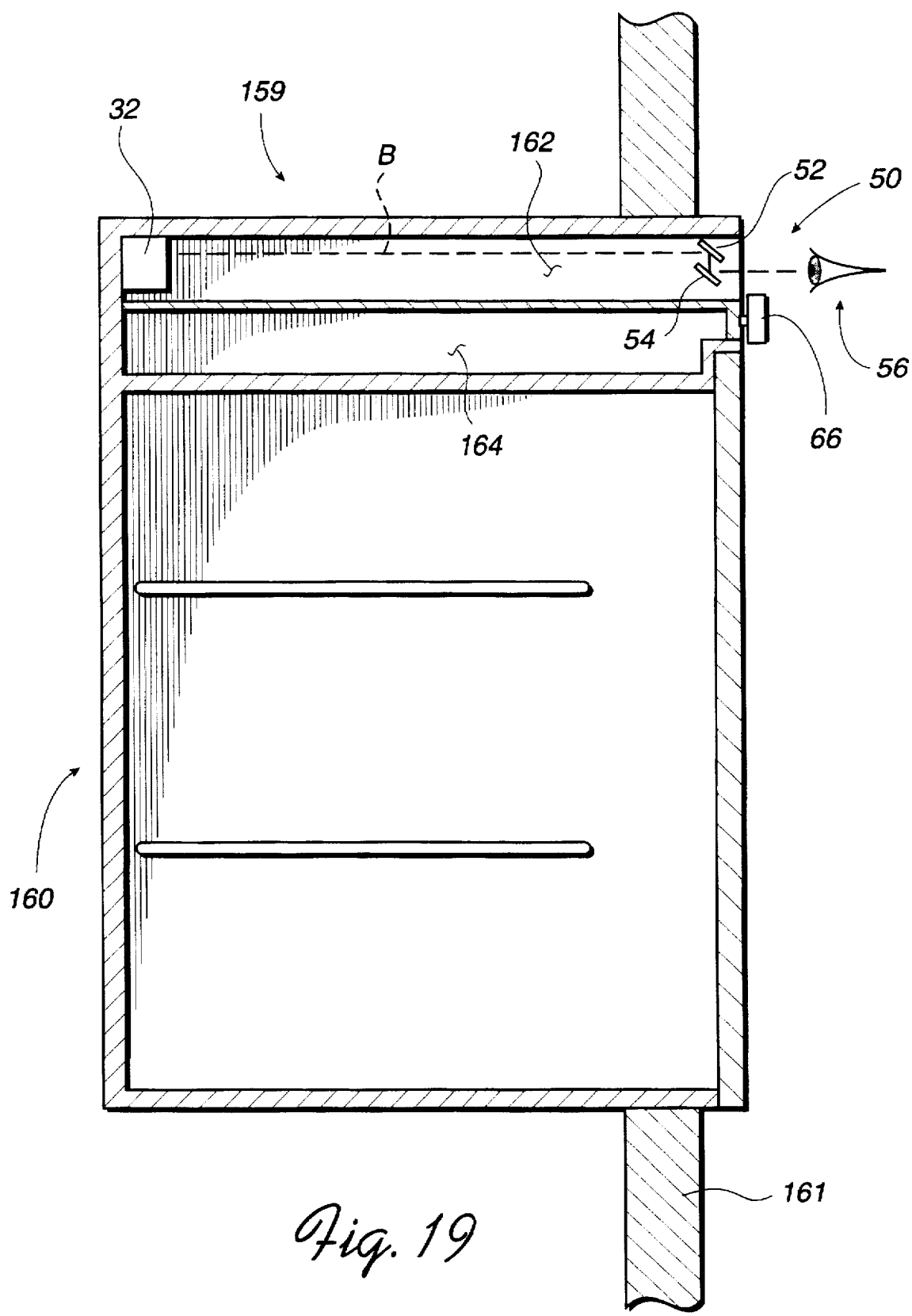
FIG. 19 shows an embodiment of a display system in accordance with the present invention installed in a domestic appliance and having a fixed relationship between a scanning unit and display unit.

Above described embodiments and applications of a display system in accordance with the present invention are described above with reference to arrangements in which there is no fixed spatial relationship between a display unit and a scanning unit. The principle of the invention however may be applied to any self-contained display system where it is desired to provide a large, real two-dimensional display image in a limited space. Such a display could be provided for example in a household appliance such as an oven wherein the scanning unit is actually incorporated in the appliance and a user approaches the scanning unit for viewing the display. Such an arrangement is illustrated in FIG. 19. Here, an oven 160 is mounted in a wall 161. A display system 159 is provided in a relatively shallow space 162 over the oven. This space accommodates at one end thereof a display unit 32 including a one-dimensional display element array as discussed above, and at on opposite end thereof a periscope-type scanning unit including a scanning mirror and a fixed mirror 54. A space below 164 below accommodates oven control components (not shown) operated by controls such as control 66. Scanning unit 50 and display unit 32 cooperate in the manner discussed above with reference to FIG. 1 to present a two-dimensional display to a viewer's eye 56. Electronic components are omitted from the illustration of FIG. 19 for simplicity.

Clearly, in display system 159, the spatial relationship between scanning unit 54 and display unit 32 is intentionally fixed. The most important characteristic of the present invention however is preserved, inasmuch as the width of a perceived display is determined entirely by the width of the light source array of display unit 32, while the height of the display is determined only by the number of scan lines of the image, and the total angle of scan. The system does not include any optical elements for magnifying the two-dimensional image viewed through scanning unit 50. As discussed above, it is this characteristic which provides that there can be spatial variation between a scanning unit and a display system.

From the description presented above, different embodiments of display systems in accordance with the present invention, and uses therefor, may be devised by one skilled in the art to which the present invention pertains, without departing from the spirit and scope of the invention. Accordingly, it should be noted that the present invention is not limited by the above-described embodiments and exemplary uses. Rather, the invention is limited only by the claims appended hereto.

What is claimed is:

1. A display system for displaying a two-dimensional image comprising:

display means including a plurality of light sources arranged to form a one-dimensional array of display elements, said display means including means for modulating each of said light sources for representing elements of the two-dimensional image;

at least one scanning means carried by a user for viewing said one-dimensional array, said scanning means in electronic communication with said display means, and including a scanning device and driving means for driving said scanning device;

said modulating means and said scanning means cooperative via said electronic communication for synchronizing said modulating means and said scanner driving means such that the user views said one-dimensional array of display elements, via said scanning means, as the two-dimensional image; and distance between said scanning means and said display means being variable while still permitting the user to view the two-dimensional image through said scanning means.

2. The display system of claim 1 wherein said electronic communication is via a radio link.

3. The display system of claim 1 wherein said electronic communication is via an optical link.

4. The display system of claim 1 wherein said scanning means is located in eyewear worn by the user.

5. The display system of claim 1, further including means for maintaining a constant aspect ratio in the two-dimensional image as the distance between said scanning means and said display means is spatially varied.

6. The display system of claim 1 wherein said plurality of light sources includes red, green, and blue light sources arranged such that each display element includes one red, one green, and one blue light source.

7. A display system for displaying a two-dimensional image comprising:

display means including a plurality of light sources arranged to form a one-dimensional array of display elements said display means including means for modulating each of said light sources for representing elements of the two-dimensional image;

at least one scanning means, said scanning means located in eyewear wearable by a user for viewing said one-dimensional array, said scanning means in electronic communication with said display means, and including a scanning device and driving means for driving said scanning device;

said modulating means and said scanning means cooperative via said electronic communication for synchronizing said modulating means and said scanner driving means such that the viewer views said one-dimensional array of display elements through said scanning means as the two-dimensional image; and distance between said scanning means and said display means being variable while still permitting the viewer to view the two-dimensional image.

8. The display system of claim 7 wherein said display means and said modulating means arranged to provide sequentially all image-elements of right and left frames of a stereoscopic video image; and including first and second scanning means for respectively the right and left eyes of the user, said first scanning means arranged such that the user sees only elements of right video frames therethrough and said second scanning means arranged such that the viewer sees only elements of left video frames therethrough, whereby the viewer views a stereoscopic two-dimensional image through both scanning means.

9. The display system of claim 7 wherein said plurality of light sources is located in a fixed location in a room.

10. The display system of claim 7 wherein said plurality of light sources is in a fixed location on or in a vehicle.

11. The display system of claim 7 wherein said plurality of light sources is worn by the user.

12. The display system of claim 7 wherein said plurality of light sources is carried by the user.

13. The display system of claim 7, further including means for maintaining a constant aspect ratio in the two-dimensional image as the distance between said scanning means and said display means is spatially varied.

14. A display system for displaying a two-dimensional image comprising:

display means including a plurality of light sources arranged to form a one-dimensional array of display elements said display means including means for modulating each of said light sources for representing elements of the two-dimensional image;

at least one scanning means carried by a user for viewing said one-dimensional array, said scanning means in electronic communication with said display means, and including a scanning device and driving means for driving said scanning device;

said display means and said scanning means cooperative via said electronic communication for synchronizing said modulating means and said scanning device driving means such that the viewer views said one-dimensional array of display elements through said scanning means as the two-dimensional image, distance between said scanning means and said display means being variable while still permitting the user to view the two-dimensional image through said scanning means; and aspect ratio control means for maintaining a constant aspect ratio in the two-dimensional image as the distance between said scanning means and said display means is spatially varied.

15. The display system of claim 14, wherein said aspect ratio control means includes means associated with said display means for generating an acoustic pulse in response to a pulse signal, and means for transmitting said pulse signal to said scanning means via said electronic communication; means associated with said scanning device driving means for receiving said pulse signal and said acoustic pulse and determining therefrom a distance signal representative of the distance between said scanning means and said display means; and operation of said scanning device driving means being controlled by said distance signal for maintaining said constant aspect ratio.

16. The display system of claim 14, wherein said aspect ratio control means includes a four-quadrant detector associated with said scanning means; lens means for focussing a replica of the two-dimensional image on said quadrant detector; means for deriving an error signal from output of said four-quadrant detector, said scanning device driving means being controlled by said error signal for maintaining said constant aspect ratio.

17. A display system for displaying a stereoscopic two-dimensional video image comprising:

display means including a plurality of light sources arranged to form a one-dimensional array of display elements said display means including means for modulating each of said light sources for representing elements of the stereoscopic two-dimensional image, said display means and said modulating means arranged such that said light sources represent sequentially all image-elements of right and left frames of the stereoscopic two-dimensional video image;

first and second scanning means, said first and second scanning means located in eyewear carried by a user for viewing said one-dimensional array, said first and second scanning means for respectively the right and left eyes of the user;

said first and second scanning means in electronic communication with said display means, and including a scanning device and driving means for driving said scanning device, and said first scanning means arranged such that the viewer sees only elements of right video frames therethrough and said second scanning means arranged such that the viewer sees only elements of left video frames therethrough;

said modulating means and said first and second scanning means cooperative via said electronic communication for synchronizing said modulating means and said scanner driving means such that the user views said one-dimensional array of display elements as the stereoscopic two-dimensional image; and distance between said first and second scanning means and said display means being variable while still permitting the viewer to view the stereoscopic two-dimensional image through said first and second scanning means.

18. The display system of claim 16 wherein said plurality of light sources includes red green and blue light sources arranged such that each display element includes one red, one green, and one blue light source.

19. A display system for displaying a two-dimensional image comprising:

display means including a plurality of light sources arranged to form a one-dimensional array of display elements of a predetermined length, said display means including means for modulating each of said light sources for representing elements of the two-dimensional image;

at least one scanning means carried by a user for viewing said one-dimensional array, said scanning means in electronic communication with said display means, and including a scanning device and driving means for driving said scanning device;

said modulating means and said scanning means cooperative via said electronic communication for synchronizing said modulating means and said scanner driving means such that the user views said one-dimensional array of display elements, via said scanning means, as the two-dimensional image; and wherein the width of the viewed two-dimensional image is determined entirely by the length of said one-dimensional array of display elements, the system not including any optical elements for providing a magnified image of said array.

* * * * *